United States Patent
Jean et al.

(10) Patent No.: US 11,338,381 B2
(45) Date of Patent: May 24, 2022

(54) METHOD AND SYSTEM FOR WIRE ELECTRO-DISCHARGE MACHINING A COMPONENT

(71) Applicant: PRATT & WHITNEY CANADA CORP., Longueuil (CA)

(72) Inventors: Joel Jean, St-Constant (CA); Ghislain Hardy, Ste-Julie (CA); Visal Ing, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 312 days.

(21) Appl. No.: 16/523,417

(22) Filed: Jul. 26, 2019

(65) Prior Publication Data

US 2021/0023638 A1    Jan. 28, 2021

(51) Int. Cl.
  *B23H 7/20*   (2006.01)
  *B23H 7/06*   (2006.01)
  *B23H 7/08*   (2006.01)

(52) U.S. Cl.
  CPC ............... *B23H 7/20* (2013.01); *B23H 7/065* (2013.01); *B23H 7/08* (2013.01); *G05B 2219/45043* (2013.01)

(58) Field of Classification Search
  CPC . B23H 7/20; B23H 7/065; B23H 7/08; G05B 2219/45043; G05B 19/4097; G05B 2219/36504
  See application file for complete search history.

(56) References Cited

U.S. PATENT DOCUMENTS

| | | | | |
|---|---|---|---|---|
| 4,361,745 A * | 11/1982 | Rupert | ..................... | B23H 7/20 219/69.13 |
| 5,041,984 A * | 8/1991 | Watanabe | .............. | B23H 7/065 700/162 |
| 5,418,344 A * | 5/1995 | Magara | .................. | B23H 7/065 219/69.12 |
| 6,850,874 B1 * | 2/2005 | Higuerey | ................. | B23H 7/20 703/4 |
| 2004/0244180 A1 * | 12/2004 | Jones | ..................... | B23Q 3/063 29/559 |

(Continued)

OTHER PUBLICATIONS

Wang et al., "Geometrical Defect Detection in the Wire Electrical Discharge Machining of Fir-tree Slots Using Deep Leaning Techniques", Applied Sciences 9(1):90, published Dec. 2018, pp. 1-8.*

*Primary Examiner* — Geoffrey S Evans

(74) *Attorney, Agent, or Firm* — Norton Rose Fulbright Canada LLP

(57) ABSTRACT

Methods and systems for wire-electro discharge machining of components are described. The method comprises machining a first component by moving a wire-EDM electrode along a first set of cutting paths associated with a plurality of cutting passes, the cutting paths determined based on a desired profile shape of the component, obtaining a cutting parameter of the first component post-machining, determining a first modified cutting path for a second component based on the cutting parameter, and machining the second component by moving the wire-EDM electrode along a second set of cutting paths associated with the plurality of cutting passes, the second set of cutting paths comprising the first modified cutting path.

20 Claims, 9 Drawing Sheets

(56) References Cited

U.S. PATENT DOCUMENTS

| | | | |
|---|---|---|---|
| 2011/0158814 A1* | 6/2011 | Metri | F01D 5/3046 |
| | | | 416/219 R |
| 2015/0127136 A1 | 5/2015 | Abe | |
| 2016/0327931 A1* | 11/2016 | Gu | G05B 19/402 |
| 2016/0346853 A1* | 12/2016 | Tuboguchi | B23H 1/02 |
| 2017/0038757 A1* | 2/2017 | Novakovic | G05B 19/19 |
| 2017/0082428 A1* | 3/2017 | Trend | G05B 19/4097 |
| 2017/0151618 A1 | 6/2017 | Shirai | |
| 2019/0232408 A1* | 8/2019 | Hiraga | B23H 7/105 |

\* cited by examiner

METHOD AND SYSTEM FOR WIRE ELECTRO-DISCHARGE MACHINING A COMPONENT

TECHNICAL FIELD

The present disclosure relates generally to methods and systems for wire electro-discharge machining of components.

BACKGROUND OF THE ART

"Wire Electro-Discharge Machining" (Wire-EDM) is a process that uses a wire electrode to machine metal. Wire-EDM may provide a highly accurate finished surface and is a relatively inexpensive process. However, Wire-EDM can be slower relative to other cutting processes and many parameters affect the global cycle time and final geometry. Multiple passes are often required to achieve a desired surface integrity.

Therefore, improvements are needed.

SUMMARY

In accordance with a broad aspect, there is provided a method for wire-electro discharge machining (wire-EDM) components. The method comprises machining a first component by moving a wire-EDM electrode along a first set of cutting paths associated with a plurality of cutting passes, the cutting paths determined based on a desired profile shape of the component, obtaining a cutting parameter of the first component post-machining, determining a first modified cutting path for a second component based on the cutting parameter, and machining the second component by moving the wire-EDM electrode along a second set of cutting paths associated with the plurality of cutting passes, the second set of cutting paths comprising the first modified cutting path.

In accordance with another broad aspect, there is also provided a system for Wire-electro discharge machining (EDM) components. The system comprises a processing unit and a non-transitory memory having stored thereon program instructions. The program instructions are executable by the processing unit for machining a first component by moving a wire-EDM electrode along a first set of cutting paths associated with a plurality of cutting passes, the cutting paths determined based on a desired profile shape of the component, obtaining a cutting parameter of the first component post-machining, determining a first modified cutting path for a second component based on the cutting parameter, and machining the second component by moving the wire-EDM electrode along a second set of cutting paths associated with the plurality of cutting passes, the second set of cutting paths comprising the first modified cutting path.

In accordance with yet another broad aspect, there is provided a method for wire-electro discharge machining (wire-EDM) components. The method comprises machining a first component by moving a wire-EDM electrode along a first set of cutting paths associated with a plurality of cutting passes, the cutting paths determined based on a desired profile shape of the component; obtaining a displacement speed of the wire-EDM electrode for the first component post-machining; determining a first modified cutting path for a second component based on the displacement speed; and machining the second component using the first modified cutting path Further details will be apparent from the detailed description and figures included below.

DESCRIPTION OF THE DRAWINGS

Reference is now made to the accompanying figures, in which.

DETAILED DESCRIPTION

Figure 1:
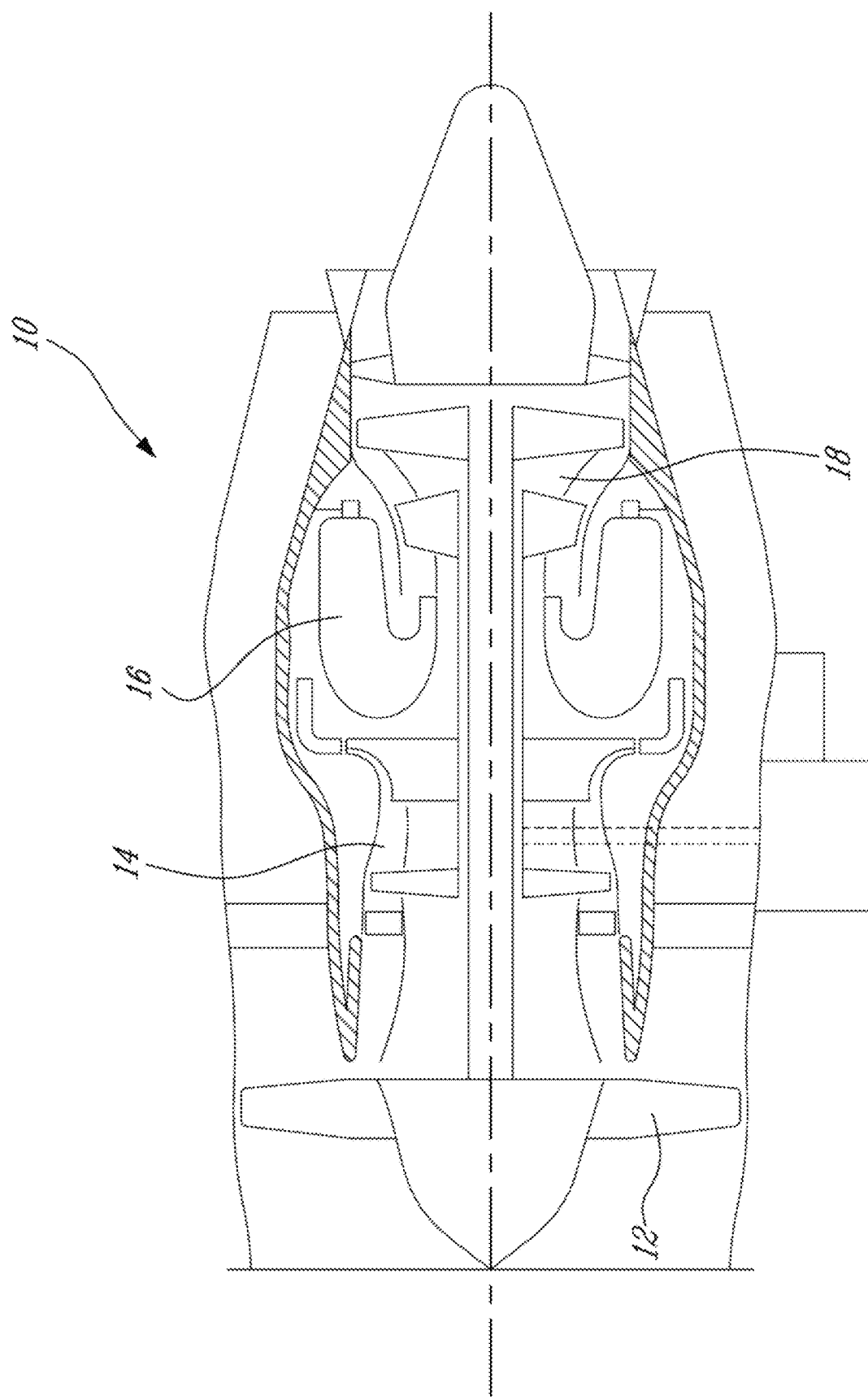
FIG. 1 is a schematic cross-sectional view of an example gas turbine engine.

FIG. 1 illustrates a gas turbine engine 10 of a type provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
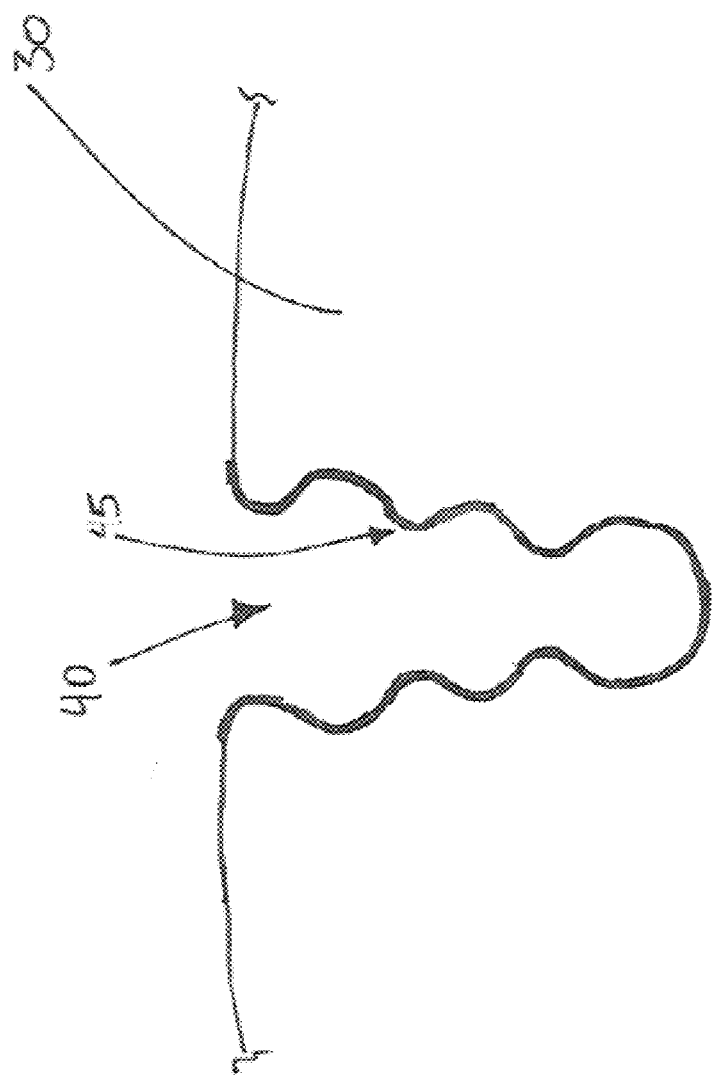
FIG. 2 is a fragmentary cross-sectional view of an example turbine disc having a firtree slot formed therein by Wire-EDM.

Turbine section 18 of the gas turbine engine 10 includes at least one turbine disc 30 having a plurality of turbine blades mounted thereto. An example is shown in FIG. 2. Turbine discs are sometimes machined by wire Electro-Discharge Machining (EDM), in order to form the slots 40 having a "firtree" profile 45. The firtree profile slots 40 receive correspondingly shaped roots of the turbine blades therein. At least the firtree profiles 45, and/or the entire slots 40, may be formed in the turbine disc 30 using a Wire-EDM operation.

Figure 3:
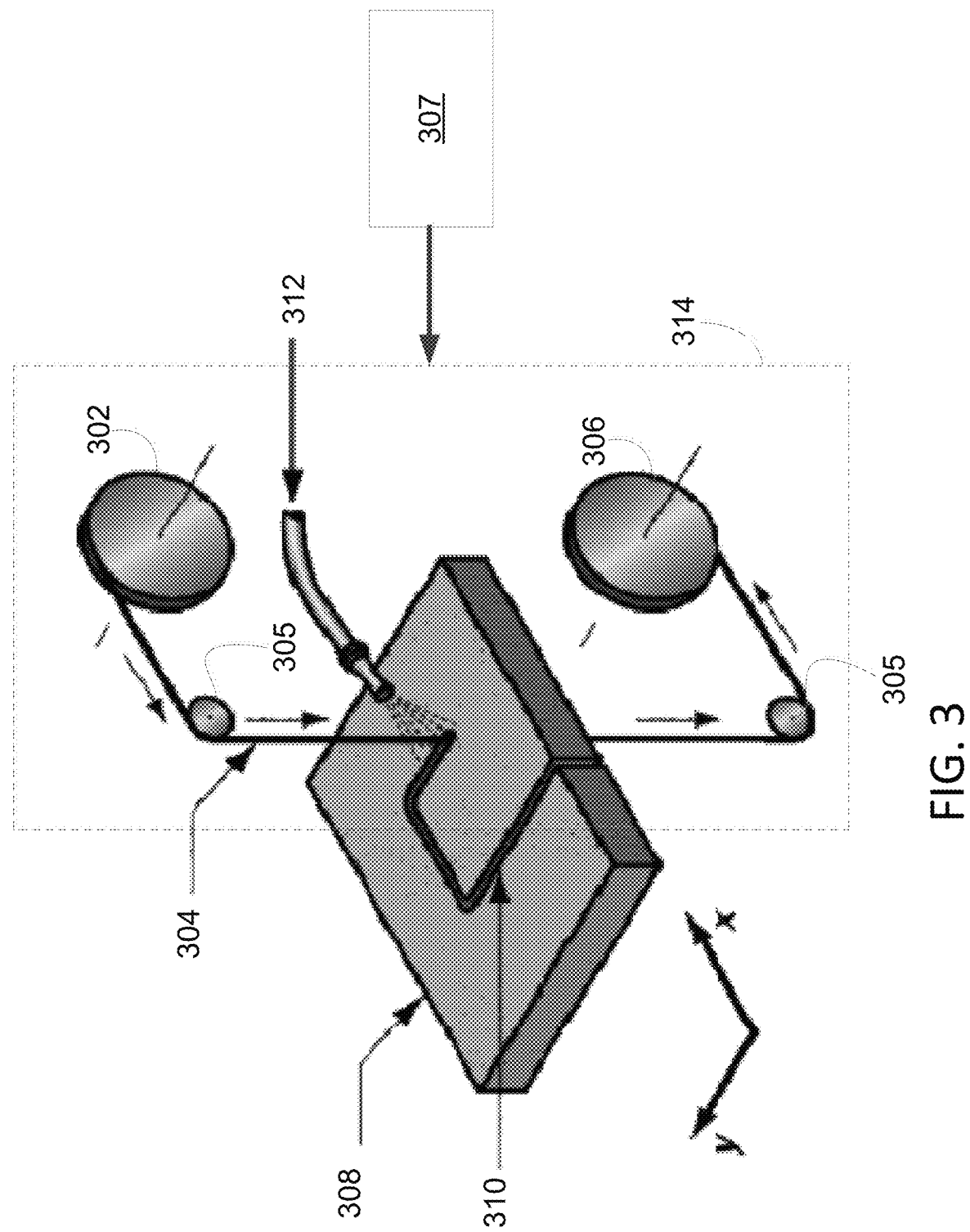
FIG. 3 is a schematic diagram of machining a component by Wire-EDM.

Wire-EDM is a machining process in which material may be removed from a part (i.e. profiles may be formed in the part) by spark erosion caused by electric discharge between a wire electrode and a workpiece. An example is schematically illustrated in FIG. 3. From a wire coil 302, a wire electrode 304 is fed via a wire guide 305. The wire electrode 304 is collected by a collection coil 306. When the wire electrode 304 is placed close to the workpiece 308, spark discharge occurs, which causes material from both the workpiece 308 and the wire electrode 304 to be removed. The discharge is supported by a dielectric 312, which helps cool the process and dispose decompressed material. The workpiece 308 can also be completely immersed in a dielectric liquid during the process.

A controller 307 causes relative motion between the work piece 308 and the wire electrode 304 along a cutting path 310. In some embodiments, the work piece 308 is displaced along the cutting path in directions x and y. In some embodiments, the wire electrode 304, wire guides 305, wire coil 302 and collection coil 306 (generally referred to herein as the cutting equipment 314) are displaced along the cutting path 310 in directions x and y.

The cutting path 310 is determined in accordance with a desired profile shape of the component being machined, based on a nominal geometry. Depending on the complexity of the shape or profile of the component to be machined, a plurality of cutting passes may be performed in order to obtain components having a desired surface integrity. Each cutting pass may have a different cutting path associated thereto, intended to remove the material that is expected to be present for the given cutting pass.

Certain profile shapes may cause the wire electrode 304 to deviate from the cutting path, leaving more or less material than is expected. For example, when the profile shape has tight curves, the wire electrode 304 may not be as tightly held by the wire guides 305, causing potential deviations in the cutting path. These deviations may have an impact on a subsequent cutting pass, as the cutting path associated with the subsequent cutting pass is based on an expected amount of material remaining after a previous cutting pass. The displacement speed of the wire electrode 304 may be affected, as the wire electrode 304 may slow down when there is excess material and speed up when there is missing material, thus affecting the overall machining time. It will be understood that "displacement speed of the wire electrode" is used herein to refer to a relative speed of the wire electrode 304 with respect to the work piece 308, and is applicable whether it is the work piece 308 or the cutting equipment 314 that is displaced.

Figure 4:
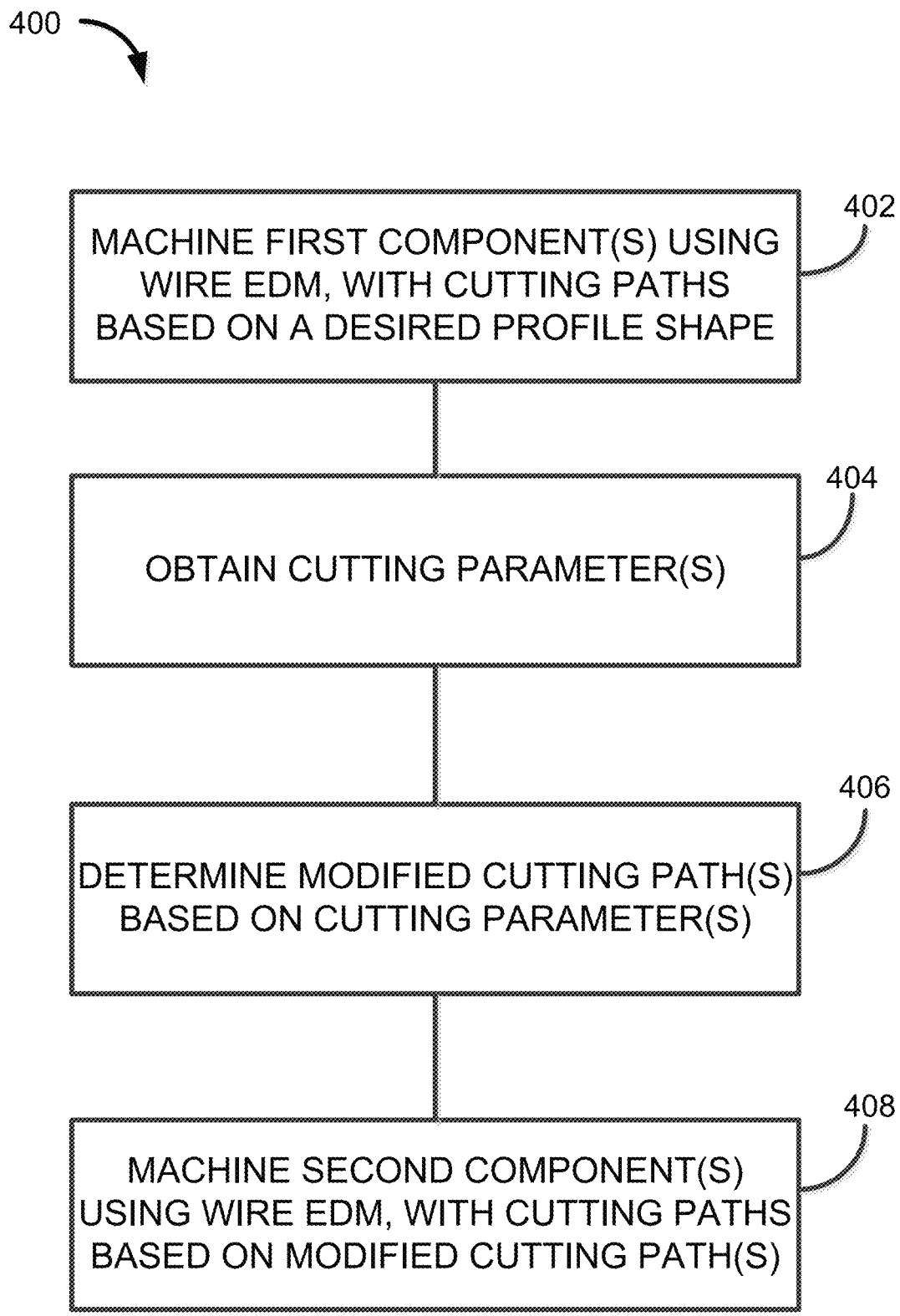
FIG. 4 is a flow chart of an example method for machining a part.

Referring to FIG. 4, there is provided a method 400 for machining components using Wire-EDM. The method 400 may be applied to any suitable parts machined by Wire-EDM. Parts for a gas turbine engine 10, such as discs and shafts, may be particularly good candidates for this process, depending on the particular design considerations. In some embodiments, the method 400 is applied to machine firtree profile slots 40 of turbine discs 30.

At step 402, one or more first components are machined using Wire-EDM, based on a first set of cutting paths. Each cutting path from the first set of cutting paths is associated with a given cutting pass for machining the component. For example, if there are two cutting passes, there are two cutting paths in the first set of cutting paths, with a first cutting path associated with the first cutting pass and a second cutting path associated with the second cutting pass. These cutting paths are determined based on a desired profile shape of the one or more components. More than two cutting passes may be used to machine the one or more first components.

In some embodiments, three cutting passes are performed. A first cutting pass, a "roughing" pass, uses a first energy level that is high enough to remove a large quantity of material from the work piece as quickly as possible, leaving a rough surface. A second cutting pass, a "finishing" pass, uses a second energy level lower than the first energy level but with a greater frequency (i.e. a greater number of current discharges per unit of time). The finishing pass cleans the rough surface left by the roughing pass. A third cutting pass, a "polishing" pass, uses a third energy level lower than the second energy level and with an even greater frequency. The polishing pass cleans the finished surface left by the finishing pass and corrects metallurgical properties of the surface, to provide a desired surface integrity.

At step 404, one or more cutting parameters of the one or more first components machined in step 402 are obtained. Cutting parameters may include one or more of cutting speed, voltage, pressure, and water conductivity. The cutting parameters may include the displacement speed of the wire as it follows a cutting path, the cutting time of a given cutting pass, and/or the overall cutting time for the component, once all cutting passes are completed. Note that voltage and displacement speed of the wire may be used in a similar manner as they are proportional.

Figure 5A:
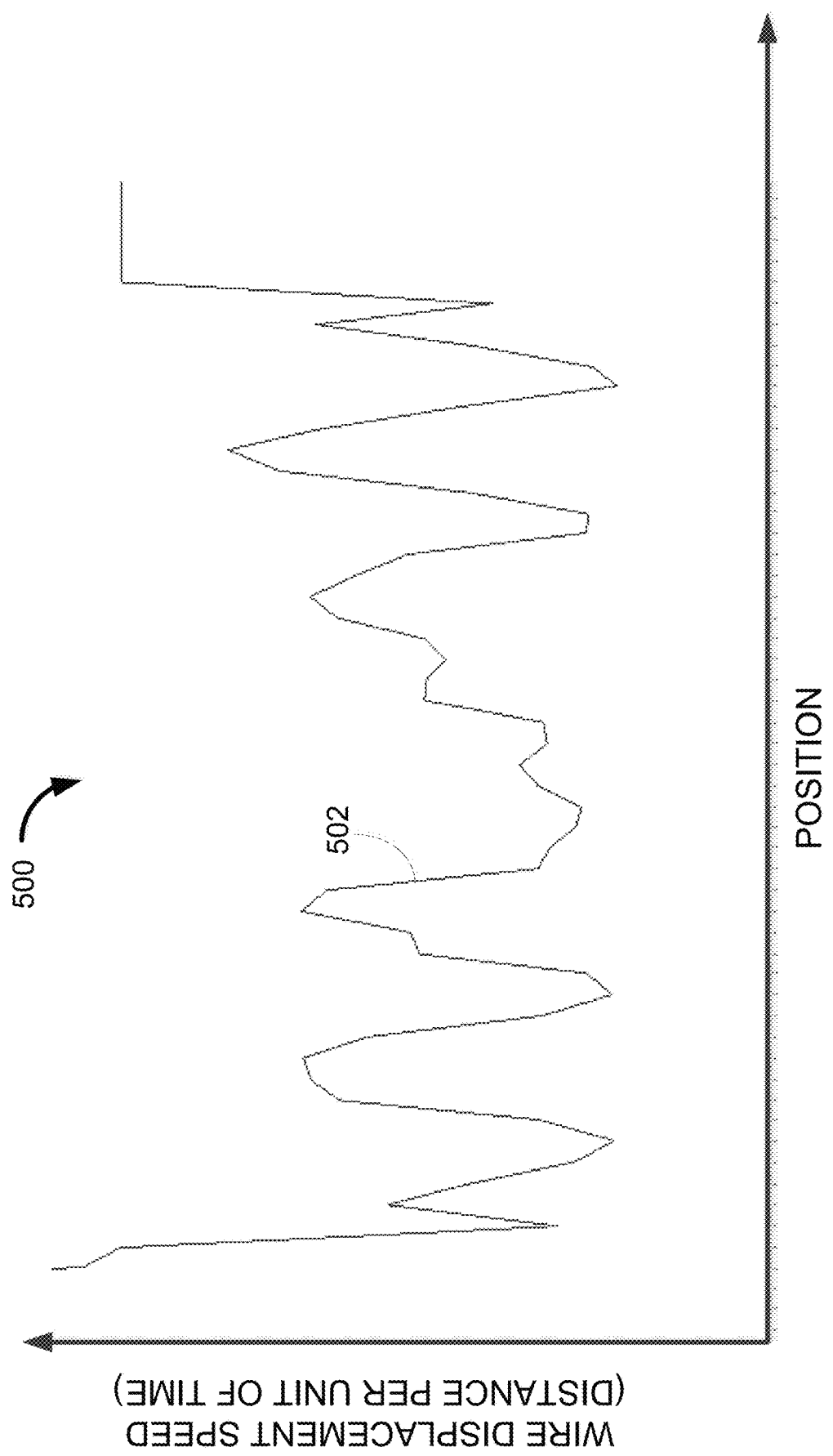
FIGS. 5A-5C are example graphs of datasets of cutting parameters.

FIG. 5A illustrates an example graph 500 of a dataset 502 for a first component, namely the wire displacement speed for a given cutting pass, per position along a profile of a workpiece. The displacement speed is represented by a distance per unit of time, for example mm/min. Other units of time may also be used. As shown, the displacement speed may vary along the cutting path of the component as a function of the complexity of the profile, as well as potential dissymmetry of a surface due to flushing conditions, orientation of the wire (i.e. tilt), the wire used, the machine used, and other parameters of the process.

Referring back to FIG. 4, at step 406 a modified cutting path is determined for at least one second component based on the cutting parameters of the one or more first components. For example, the original cutting path for the first cutting pass is modified based on the cutting parameters of the second cutting pass in order to obtain a modified cutting path for the first cutting pass of a subsequent component. In another example, the original cutting path for the second cutting pass is modified based on the cutting parameters of the third cutting pass in order to obtain a modified cutting path for the second cutting path of a subsequent component. Cutting parameters for any cutting pass N of a component X may be used to modify a cutting path of a cutting pass N−1 of a component X+1.

In some embodiments, cutting parameters for a plurality of first components are used to update the cutting path of a second component. For example, an average may be determined based on a plurality of first components instead of using data from a single first component. In the case of a component having a plurality of the same profile cut therein, such as a turbine disc 30 with slots 40, the data from all slots 40 of a given turbine disc 30 may be averaged to obtain cutting parameters used for determining the modified cutting path for a subsequent turbine disc. Alternatively, the data from one of the slots 40 may be selected by comparing the data for all slots and selecting one of the datasets based on a given parameter, such as cutting time for a cutting pass. For example, the dataset representing the slot having been cut with the fastest cutting time may be selected. Other embodiments may also apply.

At step 408, one or more second components are machined using Wire-EDM with one or more cutting paths that are based on the modified cutting path obtained in step 406. In some embodiments, only one of the cutting paths used to machine the second component is modified using the cutting parameters of the first component, the other cutting paths being based on the desired profile shape and the nominal geometry. In some embodiments, two or more of the cutting paths used to machine the second components are modified using the cutting parameters of the first components.

Figure 5B:
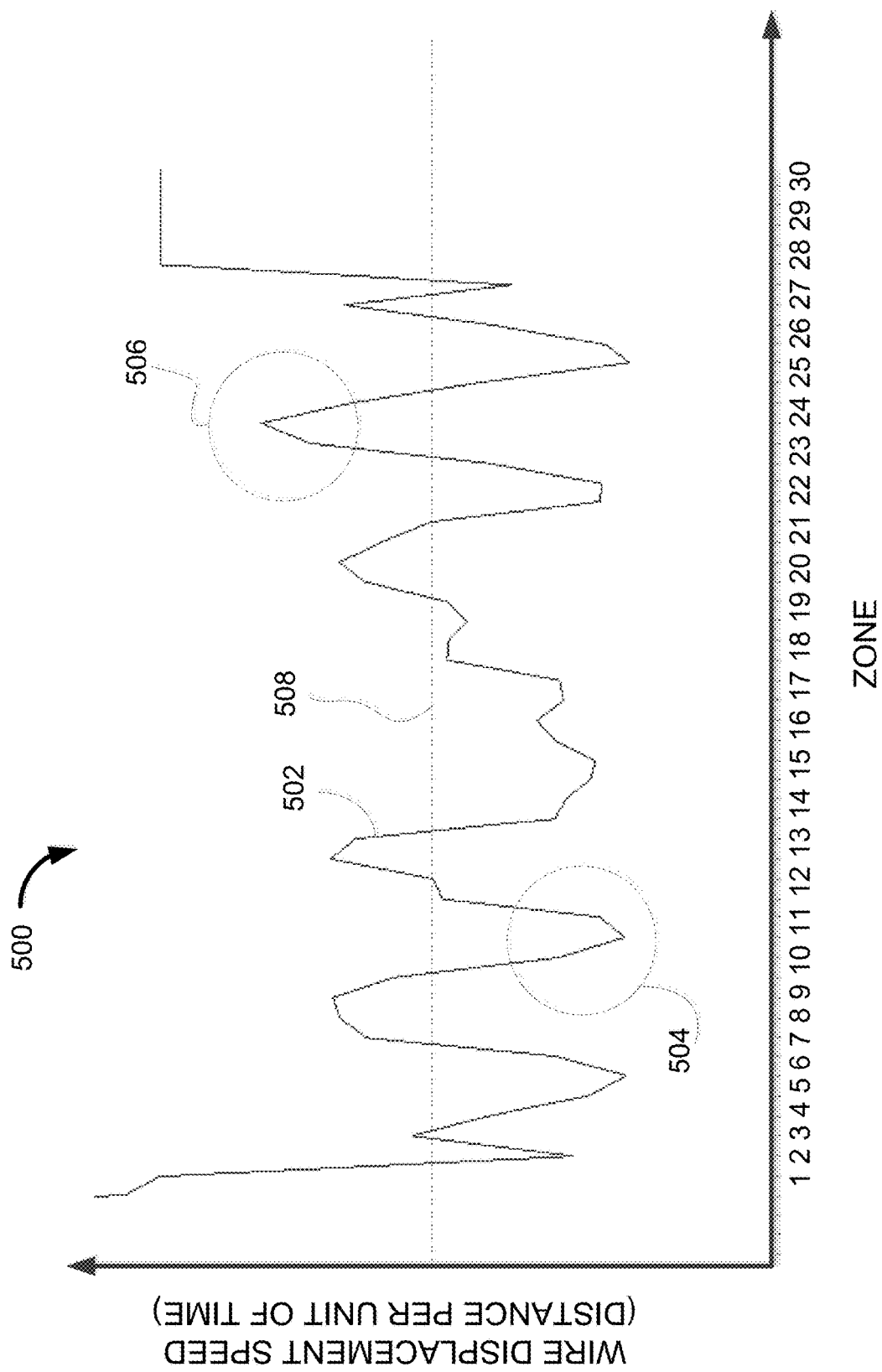

In some embodiments, determining the modified cutting path comprises separating the profile shape into a plurality of zones and mapping data obtained for the cutting pass per zone. An example is illustrated in FIG. 5B, where zones 1-30 are shown across the horizontal axis for the dataset 502. Each zone corresponds to a position along the profile shape. More or less zones may be chosen, as a function of a desired level of granularity for the data collected.

The cutting parameter may be compared to a target or reference cutting parameter. An example is shown in FIG. 5B with a target wire displacement speed 508. The target or reference may be configurable in accordance with a practical implementation. For example, in some embodiments the target wire displacement speed 508 is set to 75% of a maximum wire speed, or 80% of a maximum wire speed. Other values may also be used. The target or reference may be determined experimentally or through simulations.

In some embodiments, determining the modified cutting path comprises selecting one or more zones from the plurality of zones and determining an offset to be applied to an original cutting path for the at least one zone, in order to obtain the modified cutting path. For example, zones found in region 504 may be selected due to a large deviation below the target 508. In another example, zones found in region 506 may be selected due to a large deviation above the target 508. The one or more zones may be selected using a threshold to compare the dataset 502 to the target 508. Zones corresponding to a deviation of the cutting parameter from the target greater than the threshold are selected. The one or more zones may be selected manually, for example by visually selecting regions where the cutting parameter deviates from the target or from an expected value for the cutting parameter.

Figure 6:
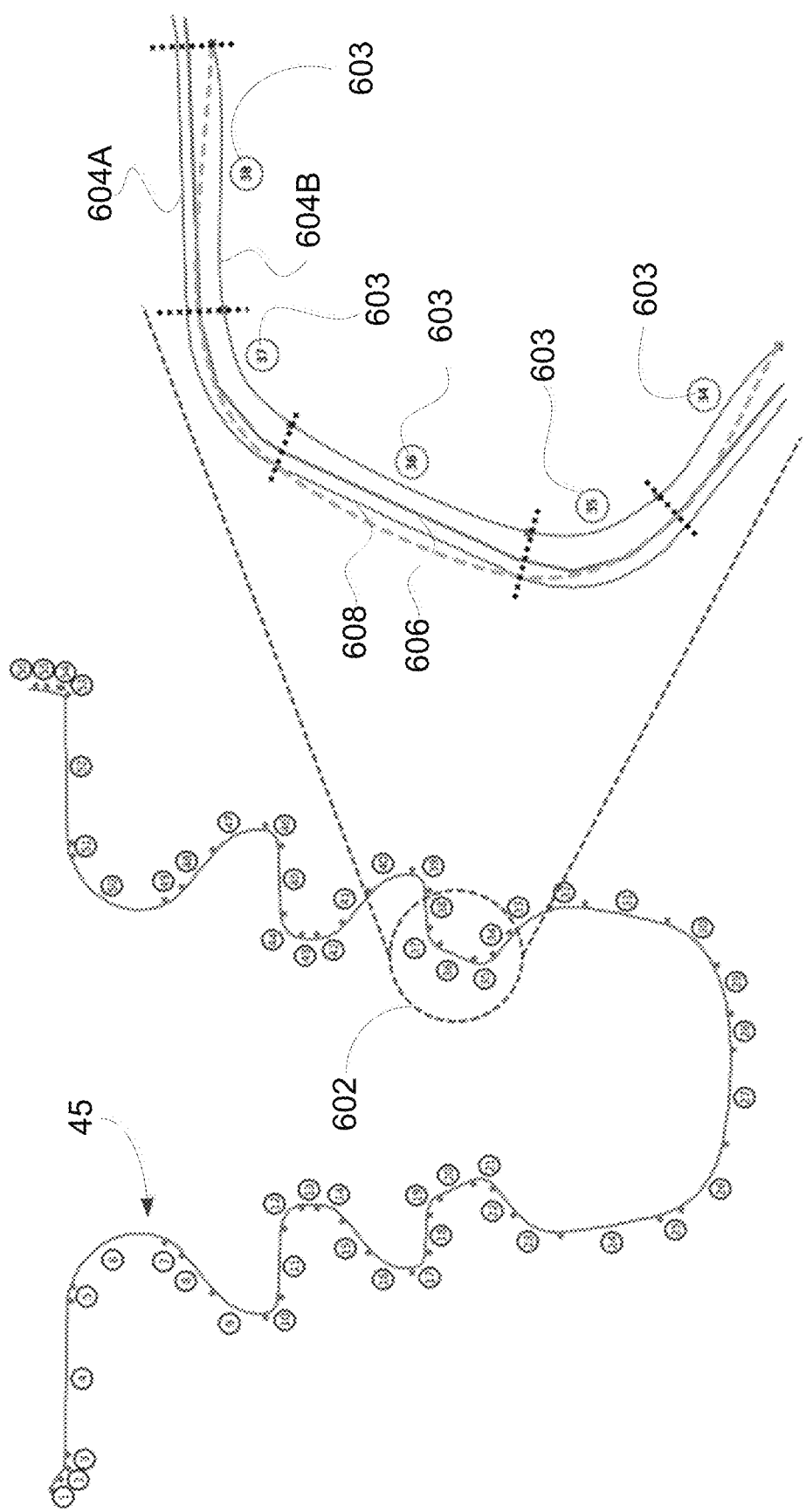
FIG. 6 illustrates an example profile of a component with an exploded view.

In some embodiments, the offsets applied to the original cutting path are limited by an upper and a lower offset limit. The upper and lower offset limits may be determined experimentally or using simulations, and selected for stability or other optimization factors. Referring to FIG. 6, there is illustrated an exploded view of region 602, comprising a plurality of zones 603 along profile 45. An upper offset limit 604A and a lower offset limit 604B are illustrated and serve as a maximum and minimum, respectively, to which an original cutting path 606 can be modified. An example modified cutting path is shown at 608.

The offsets may be determined using a look-up table having offset values associated with certain deviations in a cutting parameter from a target cutting parameter. The offset values may be determined experimentally or through simulations, for each cutting parameter. Offset values may be associated with a specific deviation of the cutting parameter from a target cutting parameter, or with a range of deviations. An example is illustrated in Table 1 for wire displacement speed as the cutting parameter.

TABLE 1

| Wire displacement speed deviation from target | Offset in x | Offset in y |
|---|---|---|
| +3 mm/min | +.01 mm | −0.02 mm |
| +4 mm/min | +.02 mm | −0.02 mm |
| +5 mm/min | +0.02 mm | −0.01 mm |

The values and units used in Table 1 are for illustrative purposes only. In some embodiments, only x-based offsets are applied. In some embodiments, only y-based offsets are applied.

The offsets may also be represented as an amplitude and orientation, for a given zone of a component. One or more offsets may be determined in a pre-machining phase, to minimize the overall time taken for the machining. Alternatively, offsets may be determined in real-time by applying a predetermined function or formula.

In some embodiments, the method 400 is applied to a given Wire-EDM machine, based on parameters obtained for the given machine, for a given component shape or profile. Alternatively, the method 400 is applied to a plurality of Wire-EDM machines, for a given component shape or profile. That is to say, parameters obtained from one machine, for a given component shape or profile, may be used to optimize the machining process of the same component shape or profile on a different machine.

In some embodiments, machining of the first components is monitored to determine which component from the first components is obtained with the shortest cutting time for a given pass. The cutting parameters for the component with the shortest cutting time are selected for optimization of the machining of the second components. In some embodiments, machining of a turbine disc 30 is monitored to determine which firtree profile 45 of a given component is obtained with the shortest cutting time for a given pass. The cutting parameters for the firtree profile 45 having the shortest cutting time are selected for optimization of the machining of the second components.

In some embodiments, the method 400 is applied iteratively, over a plurality of components. For example, data is gathered from one or more first components and used to optimize the machining of one or more second components. Data is then gathered from the one or more second components to assess whether the machining process has been fully optimized. If not, data from the one or more second components is used to optimize the machining of one or more third components, and so on, until full optimization has been reached.

Figure 5C:
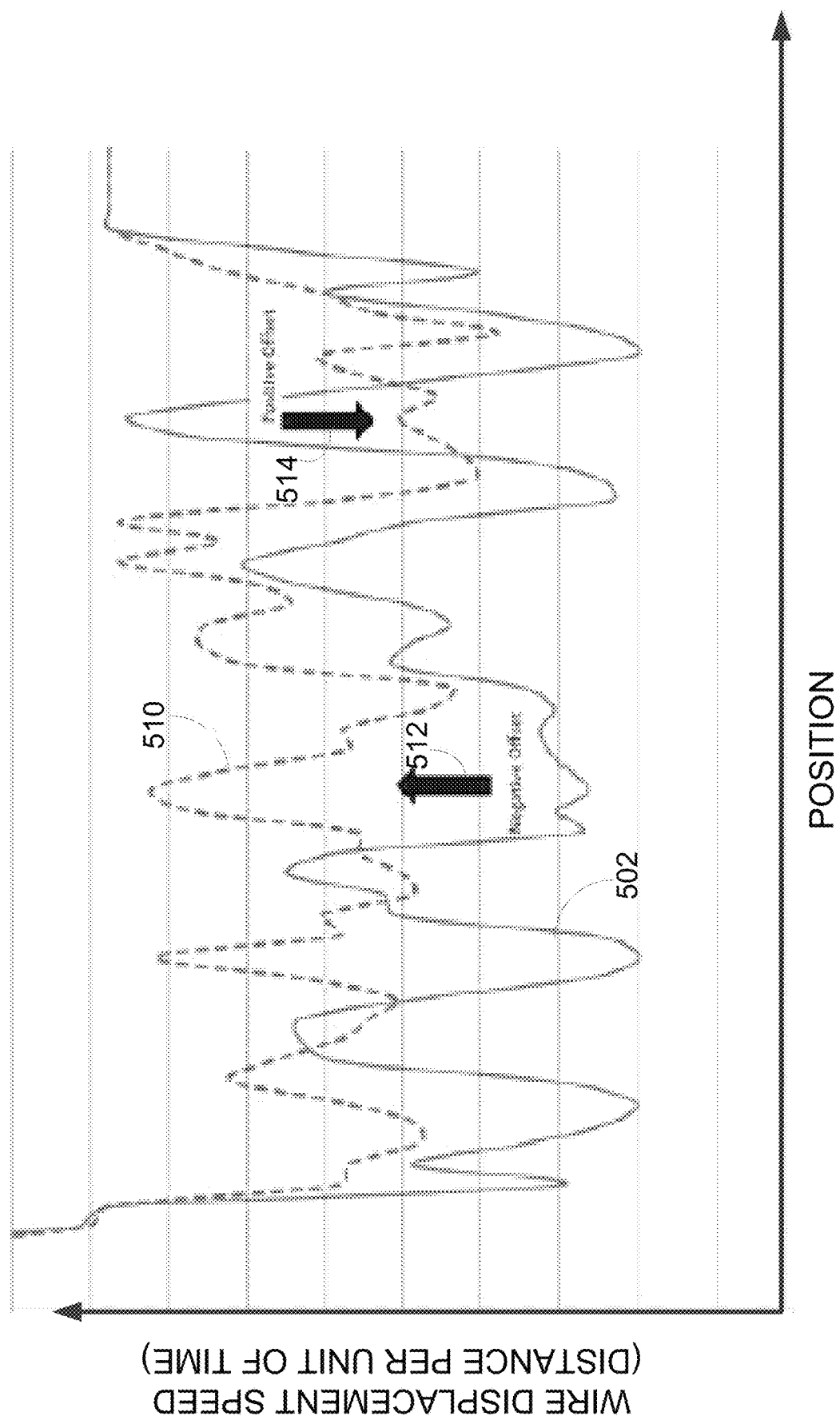

FIG. 5C illustrates an example dataset 510 from a second component overlaid on the dataset 502 from the first component. In this example, dataset 502 represents the wire displacement speed for a given cutting pass with no offsets applied. Dataset 510 represents the wire displacement speed for the same cutting pass with offsets applied. A negative offset 512 causes an increase in the wire displacement speed. A positive offset 514 causes a decrease in the wire displacement speed.

The method for machining components by Wire-EDM as described herein may be used to optimize a global cutting time for a component, by decreasing a cutting time of at least one cutting pass. It may also improve precision by providing a more constant removal of material.

Figure 7:
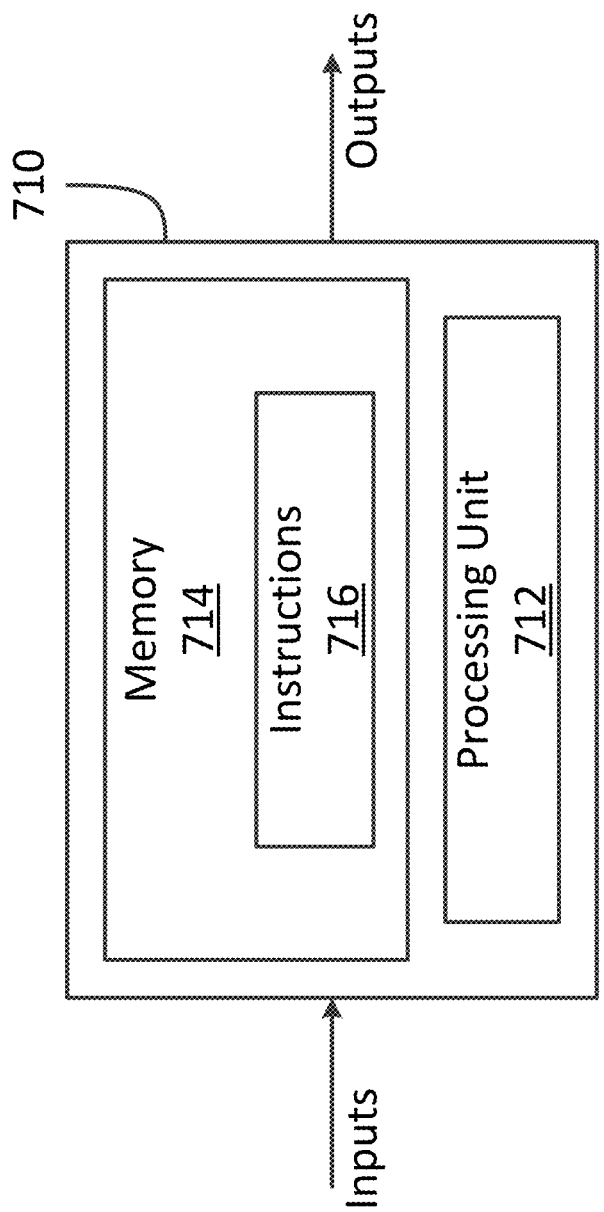
FIG. 7 is a block diagram of an example computing device.

With reference to FIG. 7, the method 400 may be implemented by a computing device 710, which can embody part or all of the controller 307. In some embodiments, the computing device is configured to perform the machining steps of the method 400 as well as the optimization steps. In some embodiments, the computing device is configured to perform only the optimization steps of the method 400. For example, the computing device 710 may be configured for obtaining the cutting parameters of the one or more first component post-machining, as per step 404, determining one or more modified cutting path as per step 406, and outputting a set of cutting paths for machining one or more second components, the set of cutting paths comprising the modified cutting path. Machining steps 402 and 404 may be performed separately, by another device. Other embodiments may also apply depending on practical implementations of the features described herein.

The computing device 710 comprises a processing unit 712 and a memory 714 which has stored therein computer-executable instructions 716. The processing unit 712 may comprise any suitable devices configured to implement the functionality of the controller 307 and/or the functionality described in the method 400, such that instructions 716, when executed by the computing device 710 or other programmable apparatus, may cause the functions/acts/steps performed by the controller 307 and/or described in the method 400 as provided herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to a device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

The methods and systems for Wire-EDM of a component as described herein may be implemented in a high level procedural or object oriented programming or scripting language, or a combination thereof, to communicate with or assist in the operation of a computer system, for example the computing device 710. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 712 of the computing device 710, to operate in a specific and pre-defined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

In some embodiments, one or more known computer software may be used in combination with the instructions 716 stored in the memory 714 of the computing device 710. For example PolyWorks™ may be used to determine the modified cutting path for machining a second component. Catia™ may be used for visualizing the new geometry generated by Polyworks™ and to post-process the new CNC path to the machine. WebDNC™ may be used to receive the cutting paths and control the cutting equipment 314. Other commercially available software may also be used.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for wire-electro discharge machining (wire-EDM) components, the method comprising:
   machining a first component by moving a wire-EDM electrode along a first set of cutting paths associated with a plurality of cutting passes, the cutting paths determined based on a desired profile shape of the component;
   obtaining a cutting parameter of the first component post-machining;
   determining a first modified cutting path for a second component based on the cutting parameter; and
   machining the second component by moving the wire-EDM electrode along a second set of cutting paths associated with the plurality of cutting passes, the second set of cutting paths comprising the first modified cutting path.

2. The method of claim 1, wherein determining a first modified cutting path comprises:
   separating the profile shape of the component into a plurality of zones;
   mapping the plurality of zones to the cutting parameter;
   selecting at least one zone from the plurality of zones; and
   determining an offset to be applied to an original cutting path for the at least one zone to obtain the first modified cutting path.

3. The method of claim 2, wherein determining the offset comprises selecting a positive or negative value to be added to the original cutting path for the at least one zone within a positive and negative offset limit.

4. The method of claim 2, wherein selecting at least one zone comprises comparing the cutting parameter to a reference and selecting at least one zone that deviates from the reference by more than a threshold.

5. The method of claim 1, further comprising:
   obtaining a cutting parameter of the second component post-machining;
   determining a second modified cutting path for a third component based on the cutting parameter of the second component; and
   machining the third component by moving the wire-EDM electrode along a third set of cutting paths, the third set of cutting paths comprising the second modified cutting path.

6. The method of claim 1, wherein the plurality of cutting passes comprises a first cutting pass, a second cutting pass, and a third cutting pass, and wherein the first modified cutting path is determined for the second component based on the cutting parameter of the first component associated with the second cutting pass or the third cutting pass.

7. The method of claim 6, wherein the first modified cutting path is determined based on the cutting parameter associated with the second cutting pass of the second component, and wherein the first modified cutting path is for the first cutting pass of the second component.

8. The method of claim 1, wherein the cutting parameter is a displacement speed of the wire-EDM electrode for at least one of the plurality of cutting passes.

9. The method of claim 1, wherein the component is a turbine disc having a plurality of firtree profile slots.

10. The method of claim 9, wherein the cutting parameter is from one of the firtree profile slots having a fastest cutting time.

11. A system for Wire-electro discharge machining (EDM) components, the system comprising:
a processing unit; and
a non-transitory memory having stored thereon program instructions executable by the processing unit for:
machining a first component by moving a wire-EDM electrode along a first set of cutting paths associated with a plurality of cutting passes, the cutting paths determined based on a desired profile shape of the component;
obtaining a cutting parameter of the first component post-machining;
determining a first modified cutting path for a second component based on the cutting parameter; and
machining the second component by moving the wire-EDM electrode along a second set of cutting paths associated with the plurality of cutting passes, the second set of cutting paths comprising the first modified cutting path.

12. The system of claim 11, wherein determining a first modified cutting path comprises:
separating the profile shape of the component into a plurality of zones;
mapping the plurality of zones to the cutting parameter;
selecting at least one zone from the plurality of zones; and
determining an offset to be applied to an original cutting path for the at least one zone to obtain the first modified cutting path.

13. The system of claim 12, wherein determining the offset comprises selecting a positive or negative value to be added to the original cutting path for the at least one zone within a positive and negative offset limit.

14. The system of claim 12, wherein selecting at least one zone comprises comparing the cutting parameter to a reference and selecting at least one zone that deviates from the reference by more than a threshold.

15. The system of claim 11, wherein the program instructions are further executable by the processing unit for:
obtaining a cutting parameter of the second component post-machining;
determining a second modified cutting path for a third component based on the cutting parameter of the second component; and
machining the third component by moving the wire-EDM electrode along a third set of cutting paths, the third set of cutting paths comprising the second modified cutting path.

16. The system of claim 11, wherein the plurality of cutting passes comprises a first cutting pass, a second cutting pass, and a third cutting pass, and wherein the first modified cutting path is determined for the second component based on the cutting parameter of the first component associated with the second cutting pass or the third cutting pass.

17. The system of claim 16, wherein the first modified cutting path is determined based on the cutting parameter associated with the second cutting pass of the second component, and wherein the first modified cutting path is for the first cutting pass of the second component.

18. The system of claim 11, wherein the cutting parameter is a displacement speed of the wire-EDM electrode for at least one of the plurality of cutting passes.

19. The system of claim 11, wherein the component is a turbine disc having a plurality of firtree profile slots.

20. A method for wire-electro discharge machining (wire-EDM) components, the method comprising:
machining a first component by moving a wire-EDM electrode along a first set of cutting paths associated with a plurality of cutting passes, the cutting paths determined based on a desired profile shape of the component;
obtaining a displacement speed of the wire-EDM electrode for the first component post-machining;
determining a first modified cutting path for a second component based on the displacement speed; and
machining the second component using the first modified cutting path.

* * * * *